March 26, 1940.   P. NELSON   2,195,132
PRESSURE COOKER
Filed April 8, 1938
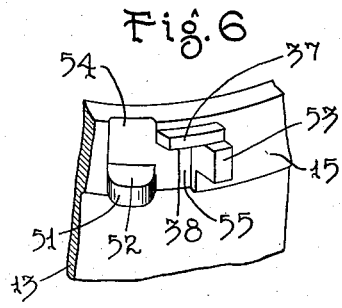
Fig.1
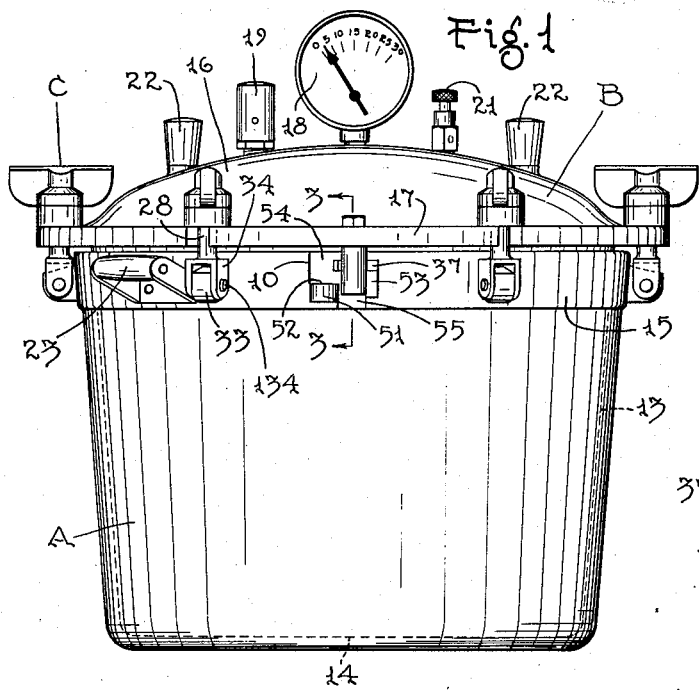
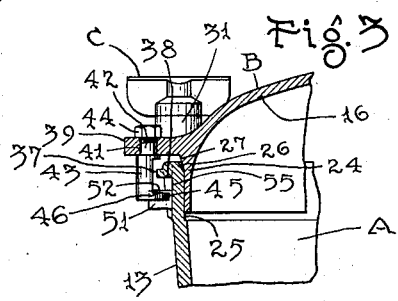
Inventor
Peter Nelson
By Caswell & Lagaard Patented Mar. 26, 1940

2,195,132

UNITED STATES PATENT OFFICE 2,195,132

PRESSURE COOKER

Peter Nelson, Menomonie, Wis., assignor, by mesne assignments, to National Pressure Cooker Company, Eau Claire, Wis., a corporation of Wisconsin Application April 8, 1938, Serial No. 200,878

4 Claims. (Cl. 220—55)

My invention relates to pressure cookers and particularly to a pressure cooker having a receptacle open at the top, and a cover adapted to close the open end of the receptacle and in which the receptacle and cover are constructed with sealing members adapted to effect a seal between the receptacle and cover when the cover is urged toward the receptacle and the sealing members are engaged, and adapted to break the seal when the cover is moved away from the receptacle and the sealing members are disengaged.

An object of the invention resides in providing a construction by means of which the cover is prevented from blowing up upon disengagement of the sealing members when the pressure in the cooker is not released prior to disengagement thereof.

Another object of the invention resides in providing a pressure cooker in which the cover is temporarily held attached to the receptacle after the fastening means have been disengaged.

Another object of the invention resides in providing a pressure cooker utilizing a number of catches for holding the cover temporarily attached to the receptacle.

A still further object of the invention resides in constructing the catches so that the same become disengaged upon rotation of the cover relative to the receptacle.

A feature of the invention resides in constructing the receptacle with an abutment and in providing a finger on the cover adapted to be moved into a position for engagement with the abutment upon rotation of the cover.

Another object of the invention resides in providing a rest for limiting the movement of the cover toward the receptacle prior to engagement of said sealing members to facilitate rotation of the cover.

A still further object of the invention resides in providing a stop for limiting the rotation of the cover.

Other objects of the invention reside in the novel combination and arrangement of parts and in the details of construction hereinafter illustrated and/or described.

In the drawings:

Fig. 1 is a side elevational view of a pressure cooker illustrating an embodiment of my invention.

Fig. 2 is a plan view of the structure shown in Fig. 1.

Fig. 3 is a fragmentary cross sectional view taken on line 3—3 of Fig. 1 and drawn to a larger scale.

Fig. 4 is a view, similar to Fig. 3, showing the parts in altered position.

Fig. 5 is a view similar to Fig. 4 showing the cover rotated with respect to the receptacle.

Fig. 6 is a perspective view of a portion of the receptacle and a part of one of the catches.

In the use of pressure cookers the user frequently forgets to release the presure within the cooker before removing the cover and when the clamps have been disengaged and the cover freed from the receptacle the pressure within the cooker causes the cover to fly upwardly from the receptacle and the steam is released in an uncontrollable manner frequently causing injury to the user. The present invention provides an extremely practical construction whereby the above noted disadvantages are overcome and safety is given to the user of the receptacle in the event that the steam presure in the receptacle is not released prior to the removal of the cover.

My invention may embody any type of receptacle and cover and for the purpose of illustration a receptacle A, open at the top, and closed by a cover B, have been shown in detail in the drawing. This receptacle and cover are closed by means of a number of clamps C which are distributed about the periphery of the cover and receptacle and which securely clamp the parts together. Extending about the periphery of the receptacle and cover are a number of catches 10, 11 and 12 which operate, as will be presently more fully described to prevent blowing up of the cover. All of these various parts will now be described in detail.

The receptacle A is preferably constructed of metal and is cylindrical or frusto-conical in form, being provided with a circumferentially extending wall 13 and a bottom 14 connected therewith. The receptacle A is open at the top and is provided with a rim 15 extending circumferentially about the upper end of the wall 13. Suitable handles, such as indicated at 23, may be attached to the rim 15 of the receptacle A for carrying the pressure cooker about. The rim 15 at its upper end is provided with a cylindrical bore 25 which serves a purpose to be presently described in detail.

The cover B has a top 16, preferably dome shaped, which is provided with a marginal portion 17 overlying the rim 15. Cover B has secured to it a pressure gauge 18, a relief valve 19, and a manually operable pressure release valve 21. Attached to the cover B are two knobs 22, preferably constructed of heat insulating material, by means of which the cover may be handled.

A tight seal, between the cover B and the receptacle A, is formed in the following manner: Upon the interior of the top 16 of cover B is formed a depending flange 24 which fits freely within the cylindrical bore 25 at the upper end of the wall 13. This bore is flared outwardly, as designated at 26, at the extreme upper end of wall 13 to form a seat which constitutes one of two sealing members acting between the cover and receptacle. The other of said sealing members is formed by a beveled surface 27 on the outermost surface of the flange 24 and in proximity to the top 16. When the cover B is urged toward the receptacle A the two sealing members are brought into engagement and the wedge action therebetween forms a seal between the cover and receptacle preventing escape of steam from the pressure cooker. When the cover is urged away from the receptacle, this seal is broken and the cover may be rotated relative to the receptacle, being guided by the flange 24 thereof.

The cover B is clamped in position upon the receptacle A by means of the clamp C previously referred to, which are identical in construction and operate in the same manner. For this reason only one of these clamps will be described, which is best shown in detail in Figs. 1, 2 and 4.

The clamp C employs a clamp screw 28 which is formed at its outer end with threads indicated at 29. Screwed upon the threads 29 is a wing nut 31 having a fairly broad shoulder 32 at its inner end. Issuing outwardly from the rim 15 of receptacle A, is a lug 33. A yoke 34, formed on the end of the screw 28 of the clamp C, straddles the lug 33 and is pivoted thereto by means of a pintle 134 which extends jointly through said yoke and lug. The marginal portion 17 of cover B is constructed, in proximity to the clamp C, with an ear 35 which extends outwardly therefrom. This ear is provided with an outwardly opening slot 36 into which the clamp screw 28 of clamp C may be inserted when the same is swung upwardly into the position shown in Fig. 2. When the parts are so arranged the wing nuts 31 may be screwed down and the shoulders 32 thereof caused to bear up the uppermost portions of ears 35 whereby the cover B is urged towards the receptacle A and the two sealing members 26 and 27 brought into engagement to effect a seal between the cover and receptacle.

Inasmuch as all of the catches 10, 11 and 12 are identical in construction, only the catch 10 will be described in detail.

A portion of the catch 10 is best shown in Fig. 6. Issuing outwardly from the rim 15 and near the uppermost portion of the same is an abutment 37 which has a downwardly facing abutting surface 38 which extends circumferentially of the receptacle A and which is substantially confined to a plane at right angles to the axis thereof. The marginal portion 17 of the cover B is provided with an ear 39 which overlies the abutment 37 when the cover is clamped in position upon the receptacle. This ear is drilled as indicated at 41 to receive the threaded shank 42 of a depending member 43 which projects downwardly therefrom. The shank 42 of said member is smaller in diameter than the member itself to form a shoulder seated against the under side of the ear 39. A nut 44, screwed upon the end of said shank, urges said shoulder against the ear and securely holds the member attached to the ear. Issuing inwardly from the lowermost portion of the member 43 is a finger 45 which extends toward the rim 15 of the receptacle A. This finger is constructed with an upwardly facing abutting surface 46 which lies substantially parallel with surface 38 of abutment 37 and which is adapted to engage said surface of abutment 37 when the parts are positioned, as shown in Fig. 1 and when the cover is urged away from the receptacle A. As will be noted in Fig. 3, the surface 46 is spaced from the surface 38 when the sealing members 26 and 27 are in engagement. When, however, these members are moved out of engagement, the surfaces 46 and 38 come in contact and limit the movement of the cover B away from the receptacle A.

The finger 45 is brought into engagement with the abutment 37 by dropping the cover B in position with the member 43 positioned to the left of said abutment, as viewed in Fig. 6. To prevent the sealing members 26 and 27 from becoming wedged together, prior to the proper positioning of the finger 45 with reference to abutment 37, a rest 51 is utilized which issues outwardly from the rim 15 and which is disposed slightly to the left of said abutment. This rest has an upper supporting surface 52 which is engaged by the lower end of the depending member 43 and which is so positioned that, when the cover is supported by member 43 and rest 52, the sealing members 26 and 27 are out of engagement. While the cover is so supported, the same may be rotated. The construction of the finger 45 and the positioning of the same and the abutment 37 are such that the finger 45 may travel from the rest 51 to a position beneath the said abutment. To limit such travel, a stop 53 is utilized which terminates movement of the member 43, when the finger 45 is immediately below the surface 38 of said abutment.

In order to aid in applying the member 43 at a locality immediately above the rest 51 the rim 15 is constructed with a vertical groove 54 immediately above said rest. This groove communicates with a circumferentially extending groove 55 which forms a continuation of the groove 54. The finger 45 is so situated that the same extends inwardly of the outer surface of the rim 15 but is of such dimensions that the same may be slid along the groove 54 when the member 43 is positioned above the same. As soon as the member 43 engages the rest 51, finger 45 may be slid along the groove 55 until the surface 46 thereof falls below the surface 38 of abutment 37.

The method of using the invention is as follows: After the food has been placed within the receptacle A, cover B is applied by inserting the flange 24 on said cover into the bore 25 of the receptacle A. At the time of applying the cover, the members 43 are placed immediately above the grooves 54. As the cover is applied the same is lowered and the members 43 passed downwardly along the grooves 54 until the same rest upon the surfaces 52 of the rests 51. Where three catches 10, 11 and 12 are employed, the cover becomes supported at three points on the rests 51. As previously stated, proportioning of the parts are such that, when the cover is so supported, the two sealing members 26 and 27 are out of engagement and the cover may be readily rotated. Cover B is next given a counter-clockwise rotation, as viewed from above, which causes the fingers 45 to pass under the abutments 37. Such movement is terminated when the members 43 strike the stops 53. By now pressing downwardly upon the cover the sealing members 26 and 27 are brought into engagement. The clamps C are next applied and the wing nuts 31 thereof screwed down to securely clamp the cover in position and to effect a tight seal between the cover and receptacle. The pressure cooker is then used in the customary manner.

When it is desired to remove the cover B, the steam pressure within the cooker is released through the pressure releasing valve 21. Thereafter the clamps C are all disengaged and the cover moved upwardly to disengage the sealing members 26 and 27 from one another. Thereafter the cover may be rotated in a clock-wise direction until the members 43 register with the grooves 54. The cover may now be lifted up vertically and freed from the receptacle. In the event that the pressure within the cooker was not released by the valve 21 and the user unloosens the clamps C, the cover would not be thrown violently upwardly from the receptacle as would otherwise have been the case, but would remain in position due to the fact that the fingers 45 would engage the abutments 37 and limit the movement of the cover away from the receptacle. Since sufficient space exists between the surfaces 46 of fingers 45 and the surfaces 38 of abutments 37 the cover can rise sufficiently to cause the sealing members 26 and 27 to become disengaged. This permits the steam to leak out past the joint between the cover and receptacle thereby eliminating any danger. Inasmuch as the pressure within the cooker tends to raise the cover as soon as the clamps are released the pressure in the cooker would be released before the operator could turn the cover to its position of removal and thus accidents would be prevented. When the sealing members 26 and 27 are in engagement it becomes impossible to rotate the cover so that in no manner would it be possible to cause an accident by the cover being blown up from the receptacle.

The advantages of my invention are manifest. With my improved pressure cooker, accidents by the blowing up of the cover by failure to release pressure in the cooker are absolutely prevented. The invention can be constructed at no appreciable increase in cost. The invention is easy to operate and is positive in action. Accurate machining of the parts of the invention utilizing the feature for procuring the added safety is not necessary. My improved pressure cooker offers no particular obstacles to the simple and economical manufacture of the same.

Changes in the specific form of my invention, as herein disclosed, may be made within the scope of what is claimed without departing from the spirit of my invention.

Having described my invention, what I claim as new and desire to protect by Letters Patent is:

1. A pressure cooker comprising a receptacle open at the top, a cover for said receptacle, sealing members on said receptacle and cover adapted to effect a seal between said receptacle and cover when the cover is urged toward the receptacle and the sealing members are engaged, and to break the seal when the cover is moved away from the receptacle and the sealing members are disengaged, said cover being rotatable relative to the receptacle when said sealing members are disengaged, an outwardly extending abutment on the upper and outer marginal surface of the side wall of said receptacle, said cover having a member fixedly secured to the outer periphery thereof and depending therefrom, said depending member being formed with a laterally extending projection at the lower end thereof positioned to engage beneath said abutment but spaced vertically therefrom when said cover is rotated to locking position and thus prevent complete removal of said cover from the receptacle in a vertical direction but permitting a limited vertical movement to break said seal, and additional interengaging means on said cover and receptacle for clamping the same into sealing engagement while maintaining said abutment and said projection in vertical spaced relation.

2. A pressure cooker comprising a receptacle open at the top, a cover for said receptacle, sealing members on said receptacle and cover adapted to effect a seal between said receptacle and cover when the cover is urged toward the receptacle and the sealing members are engaged, and to break the seal when the cover is moved away from the receptacle and the sealing members are disengaged, said cover being rotatable relative to the receptacle when said sealing members are disengaged, an outwardly extending abutment on the upper and outer marginal surface of the side wall of said receptacle, said cover having a member fixedly secured to the outer periphery thereof and depending therefrom, said depending member being formed with a laterally extending projection at the lower end thereof positioned to engage beneath said abutment but spaced vertically therefrom when said cover is rotated to locking position and thus prevent complete removal of said cover from the receptacle in a vertical direction but permitting a limited vertical movement to break said seal, a bolt connected to the receptacle and extending through an aperture in said cover, and a nut threaded on said bolt and engageable with the cover for clamping the same into sealing engagement while maintaining said abutment and said projection in vertical spaced relation.

3. A pressure cooker comprising a receptacle open at the top, a cover for said receptacle, sealing members on said receptacle and cover adapted to effect a seal between said receptacle and cover when the cover is urged toward the receptacle and the sealing members are engaged, and to break the seal when the cover is moved away from the receptacle and the sealing members are disengaged, said cover being rotatable relative to the receptacle when said sealing members are disengaged, an outwardly extending abutment on the upper and outer marginal surface of the side wall of said receptacle, said cover having a member fixedly secured to the outer periphery thereof and depending therefrom, said depending member being formed with a laterally extending projection at the lower end thereof positioned to engage beneath said abutment but spaced vertically therefrom when said cover is rotated to locking position and thus prevent complete removal of said cover from the receptacle in a vertical direction but permitting a limited vertical movement to break said seal, means carried by the receptacle and adapted to be engaged by said depending member when the cover is applied to the receptacle, said means being positioned to support said cover on the receptacle with the sealing members in non-sealing relation, and additional interengaging means on said cover and receptacle for clamping the same into sealing engagement after the cover has been rotated to disengage said depending member from the supporting means.

4. A pressure cooker comprising a receptacle open at the top, a cover for said receptacle, sealing members on said receptacle and cover adapted to effect a seal between said receptacle and cover when the cover is urged toward the receptacle and the sealing members are engaged, and to break the seal when the cover is moved away from the receptacle and the sealing members are disengaged, said cover being rotatable relative to the receptacle when said sealing members are disengaged, an outwardly extending abutment on the upper and outer marginal surface of the side wall of said receptacle, said cover having a member fixedly secured to the outer periphery thereof and depending therefrom, said depending member being formed with a laterally extending projection at the lower end thereof positioned to engage beneath said abutment but spaced vertically therefrom when said cover is rotated to locking position and thus prevent complete removal of said cover from the receptacle in a vertical direction but permitting a limited vertical movement to break said seal, an outwardly extending support on the upper and outer marginal surface of the side wall of said receptacle adapted to be engaged by said depending member when the cover is applied to the receptacle, the upper surface of said support being in a plane below the plane of the lower surface of said abutment and said support being positioned and arranged to support said cover on the receptacle with the sealing members in non-sealing relation, and additional interengaging means on said cover and receptacle for clamping the same into sealing engagement after the cover has been rotated to disengage said depending member from said support.

PETER NELSON.